March 15, 1932.  A. A. CANTON  1,849,222

COMBINATION MOTOR AND PUMP

Filed March 7, 1929

INVENTOR.
Allen A. Canton
BY
J. Kaplan
ATTORNEY.

Patented Mar. 15, 1932

1,849,222

UNITED STATES PATENT OFFICE

ALLEN A. CANTON, OF NEW YORK, N. Y., ASSIGNOR, BY MESNE ASSIGNMENTS, TO CANTON REFRIGERATORS, INC., OF NEW YORK, N. Y., A CORPORATION OF DELAWARE

COMBINATION MOTOR AND PUMP

Application filed March 7, 1929. Serial No. 345,129.

This invention relates to a combination motor and pump and has for its principal object the provision of means to make the armature serve as a rotor for the pump.

Another object of the invention is to provide a self contained combination electric motor and pump having all the operating parts fully enclosed in an air tight casing and avoiding the use of packing glands.

Still another object of the invention is to construct a device of this character having an armature running eccentric in a field and provided with centrifugally operated elements for causing a vacuum and pressure.

Still another object of the invention is to provide a device of this kind having a field with the usual windings, end plates attached to the ends of said field making an air tight enclosure for an eccentrically running armature and bearings in said end plates supporting a shaft on which the armature is keyed.

Still another object of the invention is to construct a pump casing of which the magnetic field of an electric motor is a part, a rotor in the form of an eccentrically running armature in said casing and so arranged that the windings and the outer rim of the field laminations are exposed to the atmosphere so that the heat generated can rapidly be dissipated.

Other objects will appear as the disclosure progresses. It is obvious that the actual needs of manufacture may necessitate certain mechanical changes. It is therefore not intended to limit the invention to the embodiment illustrated but rather to define such limits in the appended claims. For a more general understanding of the invention attention is now called to the drawings. In these drawings like reference characters denote like parts throughout the specification.

Figure 1:
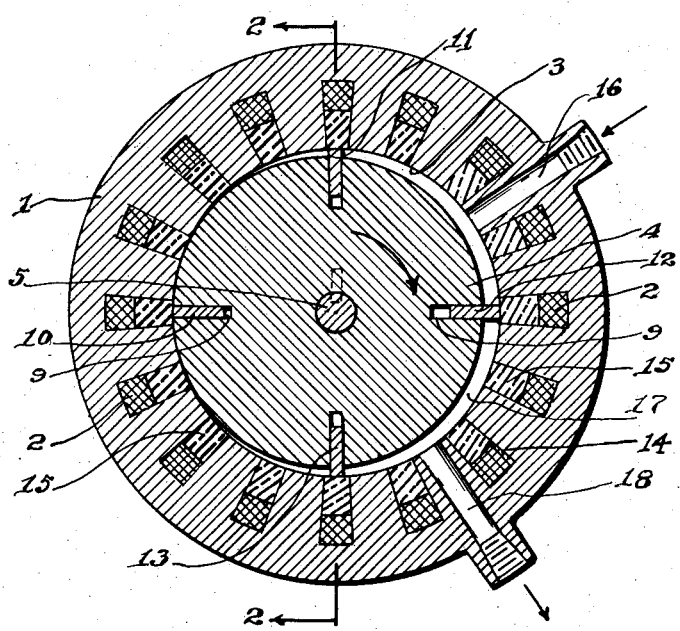
Fig. 1 is a cross section of the combination motor and pump.
Figure 2:
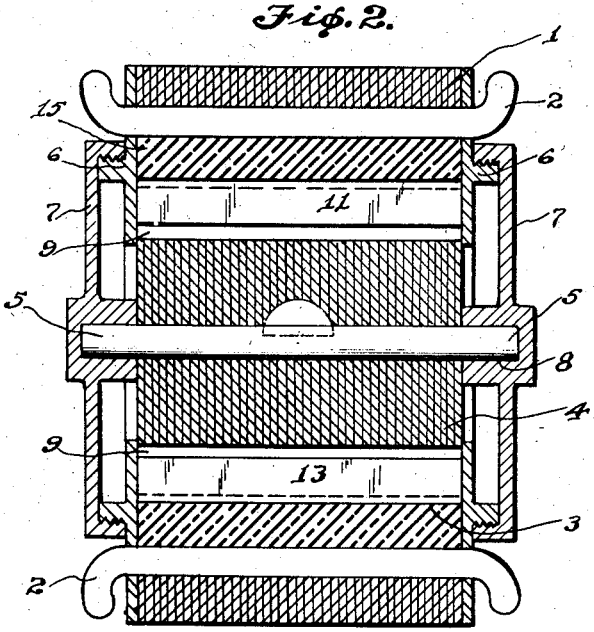
Fig. 2 is a section on line 2—2 of Fig. 1.

Referring now to the drawings in detail numeral 1 represents an electric motor field, 2 the field windings and 3 an enclosed chamber for housing the armature 4 keyed eccentrically on the shaft 5.

Attached to both ends of the field are flanges 6 to which are threadedly fastened the end plates 7. Formed in these plates are bearings 8 for the shaft 5 to revolve in. The armature as noted in Fig. 1 is provided with four slots 9 containing slidable plates 10, 11, 12 and 13 which have a tendency to fly out due to centrifugal force. The slots 14 for the field windings are made deeper than the combined thickness of the wire and in the space not taken up by the wire is poured a bakelite or other compound 15 while in its plastic state. When the compound congeals and hardens the windings will be thoroughly sealed in.

The operation of the device is as follows: When the eccentrically disposed armature rotates in a clockwise motion the plates 10, 11, 12 and 13 will fly out and bear against the inner periphery of the field. When any of these plates fly past the inlet port 16 the gas or liquid will be drawn in ahead of the plate and confined in the space 17 formed between the armature and the inner periphery of the field. As the armature keeps on revolving the locked in gas or liquid will be forced out under pressure through the outlet port 18.

It will thus be seen that I have constructed a simple and efficient combination motor and pump having relatively few part. The eccentrically rotating armature itself is the means to draw in and force out the liquid or gas. All the moving parts are hermetically sealed in and require no attention. No packing or packing glands are needed thereby avoiding any loss of efficiency of the pump. The field windings are exposed to the atmosphere so that any heat absorbed or generated by the device is dissipated. The gas or liquid to be pumped does not come in contact with the field windings thereby preventing any decomposition of the element being pumped or corrosion of the device itself.

While the construction of the field enclosure above described is preferable, the device is not limited to that specific enclosure. Modifications are possible without departing from the spirit of the invention. For example, the slotted armature with its slidable elements may be sealed in an insulating cylinder and the field placed around the cylinder or a casing may be placed around the entire field, thereby making the armature act as a centrifugal pump. Such and similar constructional changes may be made by those skilled in the art and would come under the spirit and scope of my invention as described in the following claims:

What I claim is:—

1. In a pump of the class described, the combination of a field element, of a revolving armature eccentrically mounted in said field element, a shaft for said armature, end plates at the ends of said field element having bearings for said shaft, said shaft fully confined in said bearings, inlet and outlet ports leading to the interior of said field element, and pumping means directly attached to said armature, said armature, pump and bearings fully enclosed and leaving no openings leading to the atmosphere except through said inlet and outlet ports.

2. A self contained pumping device consisting of a field element forming a chamber for an armature to revolve in, said armature eccentrically mounted on a shaft therein, plates at the end of said field element for fully enclosing said chamber and making same airtight, bearings in said end plates for said shaft, plates slidably mounted in said armature, said slidable plates and said armature directly forming the means to form suction and compression as they revolve, said armature, pumping means and bearings fully enclosed and leaving no openings leading to the atmosphere.

3. In a pumping device of the class described, the combination of a field element, of a concentric chamber in said field element in which is eccentrically mounted a rotating armature on a shaft, end plates at the end of said field element for making said chamber leak-proof, bearings in said end plates, said shaft being fully confined in said bearings, slidable plates mounted at the periphery of said armature, said slidable plates and armature forming the pumping element, the space between the periphery of the armature and said field element forming the suction and compression chamber, said armature, pumping means and bearings fully enclosed and leaving no openings leading to the atmosphere.

4. In a pumping device of the class described, the combination of a field element, of a concentric chamber in said field element in which is eccentrically mounted a rotating armature, end plates at the end of said field element for making said chamber leak-proof, bearings fully confined in said end plates, slidable plates mounted at the periphery of said armature, said slidable plates and armature forming the pumping element, the space between the periphery of said armature and the interior of said field element forming the suction and compression chamber, said suction and compression chamber changing its position as the armature revolves, said armature, pumping means and bearings fully enclosed and leaving no openings leading to the atmosphere.

Signed at New York in the county of New York and State of New York this 24th day of January A. D. 1929.

ALLEN A. CANTON.